UNITED STATES PATENT OFFICE.

IGNAZ TIMAR, OF BERLIN, GERMANY, ASSIGNOR TO FRITZ HEILIGER, OF ANDERNACH, GERMANY.

THERMOPHORIC MIXTURE.

SPECIFICATION forming part of Letters Patent No. 726,204, dated April 21, 1903.

Application filed January 9, 1903. Serial No. 138,420. (No specimens.)

*To all whom it may concern:*

Be it known that I, IGNAZ TIMAR, manufacturer, a citizen of Germany, and a subject of the King of Prussia and Emperor of Germany, residing at Berlin, Tempelhofer Ufer 1ª, in the Kingdom of Prussia and Empire of Germany, have invented certain new and useful Improvements in Thermophoric Mixtures, of which the following is a full, clear, and exact description.

The storage of heat by means of salts which readily melt or liquefy according to the methods hitherto usually employed is based upon the fact that a mixture of crystalline salts gradually gives off the heat which it has absorbed in melting upon recrystallization.

As the salts employed in many cases are capable of absorbing a considerable quantity of heat, such a so-called "thermophore mixture" placed in a suitable container or receptacle acts as an "accumulator" of heat of great capacity.

In connection with the application of this invention, more particularly to thermophores or receptacles with soft and elastic sides—as, for instance, for hot pillows or bolsters and the like—defects have become evident which are mainly attributable to the chemical and physical character of the salt employed. These defects are, first, a disagreeable pungent odor, which interferes with the use of the thermophores for sick persons, and, second, the whole salt mixture in crystallizing forms into hard lumps, which cut or damage the sides of its container or receptacle if constructed of a soft substance, as india-rubber. Attempts have been made to obviate these defects by the addition of glycerin to the salt, so as to prevent the formation of lumps. As a consequence, when glycerin is employed the salt crystallizes out in a sand-like form, and in course of time the sharp small crystals damage the elastic or soft material of the sides of the thermophore—as, for instance, india-rubber—to a considerable extent. It has also been proposed to employ farinaceous vegetable admixtures—as, for instance, to add decoctions of linseed to the thermophore mass, so obtaining a soft mortar-like mass. On crystallizing the fats, however, which are contained in the usual vegetable substance used for such purpose—as, for instance, linseed and the products of decomposition formed—seriously affect the sides of the vessel, more particularly because these are often subjected to a boiling temperature over and over again. Moreover, the unpleasant odor of the thermophore mass is not hidden by the admixture of such emulsions and is even increased.

According to the present invention the avoidance of damage to the sides of the thermophore and the obviation of unpleasant odors are effected by adding to the thermophore mass a special kind of vegetable-seed, which is distinguished by a fat which does not affect india-rubber and other substances and by a pungent odor, which, however, is not unpleasant. Such seed, for instance, is the sunflower-seed, also the so-called "Greek hay" (*Fœnum Græcum*,) the effect of which is that the salt mixture crystallizes out into a soft mortar-like consistency, which in addition to being suitable for metal containers is also suitable for thermophores made of india-rubber and similar materials by reason of its soft consistency, as it will not cut or damage such casings. The odor of such vegetable products as *Fœnum Græcum*, moreover, possesses the property of covering or nullifying odors from the substance employed as the thermophore salt—as, for instance, sodium acetate, the odor from which is disagreeable.

The seed which is employed according to my invention is dissolved in hot water and mixed with the thermophore salt to the extent of about six to seven per centum of the whole bulk.

What I claim, and desire to secure by Letters Patent, is—

1. A thermophoric mixture containing vegetable-seeds which furnish viscous substances and a fat which will not affect india-rubber and the like, such as sunflower-seed and Greek hay-seed, (*Fœnum Græcum*,) substantially as described.

2. A thermophoric mixture comprising thermophoric salt, dissolved sunflower-seed, Greek hay-seed (*Fœnum Grœcum*) or similar vegetable-seeds which contain viscous substances and a fat which will not affect india-rubber and the like material, substantially as and in the proportions specified.

In witness whereof I subscribe my signature in presence of two witnesses.

IGNAZ TIMAR.

Witnesses:
   HENRY HASPER,
   WOLDEMAR HAUPT.